3,703,357
PROCESS FOR THE PREPARATION OF RUTILE TITANIUM DIOXIDE NEEDLES
Joseph P. Surls, Walnut Creek, David L. Bauer, Concord, and Ben F. West, Antioch, Calif., assignors to The Dow Chemical Company, Midland, Mich.
No Drawing. Continuation-in-part of application Ser. No. 847,459, Aug. 4, 1969. This application July 28, 1971, Ser. No. 166,999
Int. Cl. C01g 23/04
U.S. Cl. 423—611                    9 Claims

ABSTRACT OF THE DISCLOSURE

Disclosed is a process which involves treating a titanium dioxide composition comprising monocrystalline rutile needles having axial ratios of greater than 20 and diameters of from 0.01 to 0.20 micron in admixture with nonrutile titanium dioxide particles with a solution of hydrochloric, nitric or perchloric acid at a temperature of greater than 200° C. The process provides as a product monocrystalline rutile titanium dioxide needles having axial ratios of greater than 20 and diameters within the range of from 0.04 to about 0.3 micron. The product of the present process is an excellent opacifier for disperse systems and is superior to known titanium dioxide products as a reinforcement material for certain plastics and metals.

This application is a continuation-in-part of co-pending application Ser. No. 847,459 filed Aug. 4, 1969, now abandoned.

BACKGROUND OF THE INVENTION

Monocrystalline, rutile titanium dioxide needles are known. Long et al. report in U.S. Pat. 3,329,484 that acicular rutile crystals having length to cross sectional diameter, i.e. axial, ratios of from about 3 to about 15 may be prepared by the hydrolysis of an acidic titanium chloride solution. The resulting hydrolyzate has a high tinting strength which makes it useful as a pigment in paints. The latter product has been found to have some utility for reinforcement of plastics, however, the acicular crystals of Long et al. have only limited value for this purpose.

It is an object of the present invention to provide a novel process for the preparation of monocrystalline rutile titanium dioxide crystals.

It is a further object to provide such a process which will yield a product which is a good opacifier for disperse systems.

A further object is to provide a process which will yield a titanium dioxide product having practical utility as a reinforcing material.

An additional object is to provide such a process which does not necessitate the use of acids which are highly corrosive and/or develop high pressures at the temperatures and concentrations required for the practice of the process.

SUMMARY OF THE INVENTION

The present invention concerns a process for the preparation of monocrystalline, rutile titanium dioxide needles which comprises treating a titanium dioxide composition containing monocrystalline rutile titanium dioxide crystals having axial ratios of greater than 20 and diameters of from 0.01 to 0.20 micron in admixture with nonrutile titanium dioxide particles with a solution of nitric, perchloric or hydrochloric acid. The acid solution has a concentration of at least about 0.01 mole per liter and the reaction is carried out at a temperature greater than about 200° C. The acid concentration is no greater than about 4 moles per liter when the acid is hydrochloric or perchloric. The product of this process is a composition containing monocrystalline rutile titanium dioxide needles having an axial ratio of greater than 20 and dimensions which are greater than those of the starting rutile needles, i.e. diameters within the range of from 0.04 to 0.3 micron.

DETAILED DESCRIPTION OF THE INVENTION

The titanium dioxide composition which is treated by the present process to yield the desired product comprises monocrystalline, rutile needles having axial ratios of greater than 20 and diameters of from 0.01 to 0.2 micron. After treatment the needles have diameters of at least 0.04 micron. The composition to be treated must also contain nonrutile titanium dioxide crystals, e.g., anatase and brookite. For most efficient conversion, the nonrutile titanium dioxide in the starting composition should have no dimension in excess of 3 microns and the proportion of nonrutile particles in the composition should be at least about 10 and preferably from 15 to 70 weight percent.

Titanium dioxide compositions containing monocrystalline rutile needles having axial ratios greater than 20 and diameters of from 0.01 to 0.2 micron may be prepared by heating a titanium chloride solution containing 9.5 to 11 gram ions per liter chloride and 20 to 60 grams per liter dissolved titanium to a temperature of from 140° to 180° C. As used herein, chloride is intended to mean chloride complexes such as $TiOCl_2$ which may exist in the hydrolysis solution, as well as free chloride. It is essential in this phase of the process that the titanium chloride solution contain less than 0.001 gram ion per liter of phosphate and no more than 0.01 gram ion per liter of sulfate or bisulfate. The heating is normally carried out for a period of from 1.5 to 6 hours. In the preparation of this composition, colloidal sized titanium dioxide particles, or crystalline titanium dioxide containing at least about 50 percent monocrystalline rutile needles having axial ratios of greater than 20 and diameters of from 0.01 to 0.5 micron is used as seed material. The seed material is employed in an amount which provides an additional quantity of titanium equal to from 3 to 15 weight percent of the dissolved titanium in the solution. This process provides a composition containing at least 10 percent of the rutile needles having diameters of from 0.01 to 0.2 micron in admixture with nonrutile crystals. The nonrutile crystals prepared in this manner have essentially no dimensions in excess of 3 microns.

In general, the colloidal seed solution may be prepared from an aqueous $TiCl_4$ solution in which the atomic ratio of chlorine to titanium is from 1.5 to 4:1 and preferably from 1.6 to 2.3:1. The dissolved titanium should be in a concentration of about 5 to 30 grams per liter, preferably 8 to 15, and the pH of the solution should be within the range of from 0.3 to 0.7. The solution is heated to a temperature of from 60° to 250° C., preferably 85° to 100° C., for a period of from 0.1 to 60 minutes, with 5 to 20 minutes being the preferred heating time.

The monocrystalline rutile needle seed may be prepared by heating an acidic titanium chloride solution having a titanium concentration of 20 to 120 grams per liter, a chloride concentration of 9.3 to 13 gram ions per liter, a phoisphate concentration of less than 0.001 gram ion per liter and no more than 0.01 gram ion per liter of sulfate or bisulfate in combination with a seed material consisting of colloidal titanium dioxide seed particles to a temperature within the range of from 120° to 325° C. The colloidal seed material, which may be prepared by the method previously described, is employed in an amount which provides an additional weight of titanium of from 0.5 to 25 weight percent of the dissolved titanium content of the solution. The necessity of low concentrations of phosphate, sulfate and bisulfate precludes the use of an unpurified HCl leach liquor of ilmenite ore as the titanium source.

The preparation of the rutile starting material by the process in which colloidal seed is used provides a composition comprising at least about 10 percent monocrystalline rutile needles having axial ratios greater than 20 and diameters of from 0.01 to 0.2 micron. When crystalline seed is employed the hydrolysis product normally comprises at least about 50 percent of the rutile needles.

It has been discovered that the product of the present process comprises monocrystalline rutile needles having axial ratios of greater than 20 and diameters of from 0.04 to 0.2 micron when the starting material is prepared using colloidal seed. The average diameter of the needles in this composition is approximately 0.1 micron which makes it especially effective for opacification due to the relative uniformity of diameter at the size range required for optimum light scattering.

When the starting material is prepared by the hydrolysis of an acidic titanium chloride solution using rutile needle seed, the product of the process of the instant invention is a titanium dioxide composition containing monocrystalline rutile needles having axial ratios of greater than 20 and diameters of from 0.04 to 0.3 micron. These crystals are good opacifiers for disperse systems and are also useful reinforcement materials for certain plastics and metals. However, the crystals made by acid retreatment of the titanium dioxide composition prepared using colloidal seed are superior for opacification purposes.

The process of the instant inveniton, i.e., acid retreatment of the titanium dioxide compositions prepared as hereinbefore described, is carried out by contacting the composition with nitric, hydrochloric or perchloric acid wherein the acid concentration is at least about 0.01 mole per liter, and heating the mixture to a temperature of greater than about 200° C. until at least part of the starting composition is converted into monocrystalline rutile needles having axial ratios of greater than 20 and diameters of at least about 0.04 micron. The maximum temperature employed is preferably about 280° C. although higher temperatures can be employed where reactor design permits. The maximum acid concentration is about 4 moles per liter when hydrochloric or perchloric acid is used. Nitric acid does not present severe engineering problems at high concentrations and temperatures as do hydrochloric and perchloric acids and is the preferred acid for use in the process. The maximum concentration of nitric acid is determined by engineering practicalities within the skill of those skilled in the art.

When the acid retreatment is carried out within the preferred temperature and acid concentration range, a heating period of from 0.25 to 6 hours is sufficient for substantially complete conversion. The acid retreatment is carried out in a sealed vessel. Under the preferred reaction conditions, as set out herein, a titanium metal reactor is satisfactory. In general, the process described herein is carried out under autogenous pressure although pressure above autogenous may be employed. Introduction of an inert gas, such as air, nitrogen, carbon dioxide, argon or helium through an inlet port in the reactor provides pressure above autogenous. In practice, especially where a batch reactor is used, the process is operated at a pressure above autogenous since the gas phase prior to heating is mainly air at one atmosphere and stays in the reactor. In effect then, the process is carried out under at least autogenous pressure. Use of a diluent gas has the effect of diluting acid vapors and $H_2O$ generated in the reactor and thereby decreasing corrosion rates for reactor parts in contact with the gaseous phase.

Virtually 100 percent conversion to the desired product is possible in the practice of the process. However, at reaction temperatures and acid concentrations within the preferred ranges, some unreacted nonrutile particles normally remain. These nonrutile particles can readily be separated from the high axial ratio rutile needles by peptization and filtration. The nonrutile particles are preferably peptized with 0.1 N nitric, hydrochloric or perchloric acid although water may be used. After separation, the nonrutile particles may be mixed with additional monocrystalline rutile needles having axial ratios of greater than 20 and diameters of from about 0.01 to about 0.2 micron. This mixture is then treated by the process of the instant invention to yield additional high axial ratio rutile needles having minimum diameters of 0.04 micron. By recycling the unreacted nonrutile particles in this manner, a higher percentage of the starting titanium is converted to the rutiles needles having minimum diameters of 0.04 micron than is possible without a recycle.

The following examples in which all percents are by weight unless otherwise specified will serve to further illustrate the invention.

EXAMPLE I

Acid retreatment of titanium dioxide composition prepared by hydrolysis using colloidal seed A titanium dioxide composition containing 76 percent rutile, 17 percent brookite and 7 percent anatase, the rutile being monocrystalline and having a diameter range of from 0.01 micron to 0.1 micron, a length range of from 0.1 micron to 3.0 micron with an average axial ratio of about 50 and the nonrutile particles having no dimensions in excess of 3 microns was prepared as follows:

A colloidal seed dispersion, of titanium dioxide particles, was mixed in a ratio of one volume to ten with a master solution of $TiCl_4$ in hydrochloric acid.

In this experiment, the colloidal seed was prepared by rapidly heating a solution of titanium chloride containing about 15 grams per liter of dissolved titanium and about 24 grams per liter of chloride to a temperature of about 85° C., maintaining the temperature for about 12 minutes and then rapidly cooling to room temperature, with the reactor being agitated throughout the entire process. The $TiCl_4$ solution contained about 37 grams per liter of dissolved titanium and about 412 grams per liter of chloride. The resulting mixture thus contained about 35 grams per liter dissolved titanium and about 377 grams (10.6 gram ions) of chloride per liter. The weight ratio of the titanium in the seed to the titanium in the solution was about 0.04:1. The mixture of seed and master solution was heated at 150° C. for two hours under autogenous pressure and with moderate stirring in a glass lined Pfaudler reactor.

A portion of the product of the above process was then combined with several volumes of a 4 molar nitric acid in a glass vial. The vial was sealed and placed in a steel bomb with an ammonium hydroxide solution as a pressure equalizing pad and heated at 250° C. for two hours while being agitated by rocking.

The reprocessed product was recovered in 100 percent yield from the cooled reaction mixture by filtering, neutralizing, washing and drying. X-ray diffraction showed a 100 percent content of rutile having an average diameter of 0.11 micron. Electron photomicrographs of a representative sample of the product revealed that the rutile particles were needle form crystals having a diameter range of from about 0.04 micron to about 0.12 micron, a length range of about 0.1 micron to about 5 microns and an average axial ratio of about 50.

This product was examined for tinting strength using a modified Reynolds method of tinting strength comparison. This method characterizes a given material by a number which is a measure of its whitening power, i.e., the ability of the product to whiten a standard amount of blue color, relative to a standard pigment. In the conventional Reynolds test, the standard is Titanox B pigment with a tinting strength of 390. In the present test, an excellent commercial pigment consisting of spherical rutile particles having a tinting strength of 1600 was used as the standard. The titanium dioxide product of the present example exhibited a tinting strength of 2050. The starting titanium dioxide composition, i.e., the product of the TiCl$_4$ hydrolysis, was found to have a tinting strength of 500.

EXAMPLE II

Acid retreatment of the TiO$_2$ composition prepared by hydrolysis using crystalline seed (a) A titanium dioxide needle product was prepared from a solution containing 35 grams per liter of titanium and 10.5 gram ions per liter of chloride to which a colloidal TiO$_2$ suspension prepared as described in Example I had been added at the 4 percent level, i.e., wt. seed titanium/wt. dissolved titanium=.04. Hydrolysis at 150° C. for 2 hours produced a product which consisted of 53 weight percent rutile, 40 percent brookite and 7 percent anatase. The monocrystalline rutile needles had a diameter range of from about 0.02 to about 0.1 micron (0.026 micron average) and a length range of from about 0.1 micron to about 2 microns. The average axial ratio of the rutile needles was 35.

(b) The product of (a) was employed as the seed at the 10 percent level for the hydrolysis (2 hours at 150° C.) of a solution containing 40 grams per liter of dissolved titanium and about 10.5 gram ions per liter of chloride. A 60 percent yield was obtained of a product consisting of 68 weight percent rutile, 28 percent brookite and 4 percent anatase. The brookite and anatase particles thus produced had no dimensions in excess of three microns. The rutile crystals had a diameter range of about 0.02 micron to about 0.3 micron (average .051 micron) a length range of from about 0.1 micron to about 4 microns and an average axial ratio of about 38.

(c) The product of (b), on being contacted with a 2 molar HNO$_3$ solution at 250° C. for two hours at a 15 percent solids level, was converted to a product as follows: 96 percent rutile and 4 percent brookite. The rutile crystals had a diameter range of from about 0.04 micron to about 0.14 micron (average 0.06 micron), a length range of from about 0.1 micron to about 7 and about an average axial ratio of about 57.

EXAMPLE III

Three separate samples were prepared by the process of Example I and designated A, B and C for opacity tests. For the purpose of comparison typical TiO$_2$ pigments made by the process of U.S. Pat. 3,329,484 (designated D, E and F) and a widely used anatase TiO$_2$ pigment (G) were tested for opacity in a similar manner.

The opacity tests were conducted in the manner described in TAPPI standard T425 m–60 entitled "Opacity of Paper" and a value for opacity entitled "TAPPI Opacity" determined. In this test, sheets of paper were prepared using the opacifier being tested at different loadings (weight percent of opacifier in the paper) and determining the TAPPI opacity at each loading. Table I summarizes the results of these tests.

TABLE I

| | Wt. percent TiO$_2$ [a] | TAPPI opacity |
|---|---|---|
| TiO$_2$ Sample: | | |
| A | 2.90 | 79.87 |
| | 5.81 | 87.90 |
| B | 2.23 | 77.31 |
| | 3.46 | 81.82 |
| C | 2.77 | 79.07 |
| | 4.23 | 83.94 |
| D | 2.76 | 77.01 |
| | 5.57 | 83.37 |
| E | 2.54 | 75.54 |
| | 4.95 | 81.92 |
| F | 2.25 | 75.35 |
| | 4.41 | 80.86 |
| G | 2.56 | 74.46 |
| | 3.75 | 77.56 |
| Control | 0 | 63.01 |

[a] In paper.

Table I illustrates the superior opacification provided by the product of the instant process as compared to the other pigments tested.

EXAMPLE IV

Titanium dioxide products prepared by the present process were dispersed in methyl ethyl ketone and the resulting slurries screened and filtered. The filtered crystals were washed and slurried in a solvent characterized by consisting of p-xylene and an aliphatic hydrocarbon mixture having a boiling range midpoint of approximately 163° C. The slurries were combined at their boiling points with boiling solutions of polyolefins in the same solvent. The solvent was removed by evaporation and the resulting polymer-TiO$_2$ mixtures were compression molded into squares from which tensile pull specimens were died out. The specimens were tested in the manner of ASTM D1708–59T to determine tensile strength in p.s.i. The results of these experiments are illustrated by the following table:

| Polymer | Vol. percent TiO$_2$ [a] | Tensile strength in p.s.i. [b] | TiO$_2$ source |
|---|---|---|---|
| Polypropylene | 0 | 4,200 | Blank. |
| Do | 10.0 | 4,600 | Typical TiO$_2$ product of U.S. Pat. 3,329,484. |
| Do | 8.5 | 4,900 | Product of Ex. 1(c). |
| Do | 0 | 3,500 | Blank. |
| Do | 40.0 | 4,500 | Product of Ex. II(c). |

[a] In composite.
[b] ±150 at 95% conf. level.

What is claimed is:

1. A process for the preparation of monocrystalline, rutile titanium dioxide needles which comprises contacting, in a sealed vessel under at least autogenous pressure at a temperature of greater than about 200° C., a titanium dioxide composition, comprising monocrystalline rutile titanium dioxide needles having axial ratios of at least 20 and diameters of from 0.01 to 0.2 micron in admixture with nonrutile titanium dioxide particles having essentially no dimensions in excess of 3 microns, with an acid selected from the group consisting of nitric, hydrochloric and perchloric acid, wherein the concentration of acid in the solution is at least 0.01 mole per liter and no greater than about 4 moles per liter when the acid is hydrochloric or perchloric, until at least a portion of the titanium dioxide composition is converted into monocrystalline rutile titanium dioxide crystals having axial ratios of greater than 20 and diameters of from about 0.04 micron to about 0.3 micron.

2. The process of claim 1 wherein the process is carried out at a temperature within the range of from 200° to 280° C.

3. The process of claim 1 wherein the titanium dioxide composition includes brookite and/or anatase, as well as rutile particles and the nonrutile particles comprise at least 10 weight percent of the composition.

4. The process of claim 3 wherein the acid concentration is within the range of from about 1 to 4 molar.

5. The process of claim 1 wherein the titanium dioxide composition is prepared by heating an acidic titanium chloride solution having a titanium concentration of 20 to 60 grams per liter, a chloride concentration of 9.5 to 11 gram ions per liter, a phosphate concentration of less than 0.001 gram ion per liter and no more than 0.01 gram ion per liter of sulfate or bisulfate in combination with a seed material, consisting of colloidal titanium dioxide or monocrystalline rutile titanium dioxide needles having axial ratios of greater than 20 and diameters of from 0.01 to 0.5 micron, in an amount providing an additional weight of titanium dioxide of from 3 to 15 weight percent of the dissolved titanium content of the solution to a temperature of from 140° to 180° C.

6. The process of claim 5 wherein the colloidal seed material is prepared by heating an aqueous titanium chloride solution having dissolved titanium concentration of from 5 to 30 grams per liter, an atomic ratio of chlorine to titanium of from 1.5 to 4:1 and a pH of from about 0.3 to 0.7 to a temperature of from 60° to 250° C. for a period of at least about 0.1 minute.

7. The process of claim 5 wherein the monocrystalline rutile titanium dioxide seed material is prepared by heating an acidic titanium chloride solution having a titanium concentration of 20 to 120 grams per liter, a chloride concentration of 9.3 to 13 gram ions per liter, a phosphate concentration of less than 0.001 gram ion per liter and no more than 0.01 gram ion per liter of sulfate or bisulfate in combination with a seed material consisting of colloidal titanium dioxide particles in an amount providing an additional weight of titanium dioxide of from 0.5 to 25 weight percent of the dissolved titanium content of the solution to a temperature of from 120° to 325° C.

8. The process of claim 1 wherein less than 100 percent of the starting rutile needles are converted into the rutile crystals having diameters greater than the rutile needles and the rutile crystals and nonrutile particles are separated by peptization and filtration.

9. The process of claim 8 wherein the separated nonrutile particles are mixed with monocrystalline rutile titanium dioxide needles having axial ratios of greater than 20 and diameters of from about 0.01 to about 0.02 micron and the mixture is treated by the process of claim 1.

References Cited

UNITED STATES PATENTS

| | | | |
|---|---|---|---|
| 2,971,821 | 2/1961 | Rummery et al. | 23—202 R |
| 3,211,528 | 10/1965 | Wigginton | 23—202 R |
| 3,329,484 | 7/1967 | Long et al. | 23—202 R |

EDWARD STERN, Primary Examiner

U.S. Cl. X.R.

106—300